May 9, 1939.  A. F. CARMACK  2,157,747
ARTIFICIAL ARM
Filed Jan. 7, 1938  6 Sheets-Sheet 1
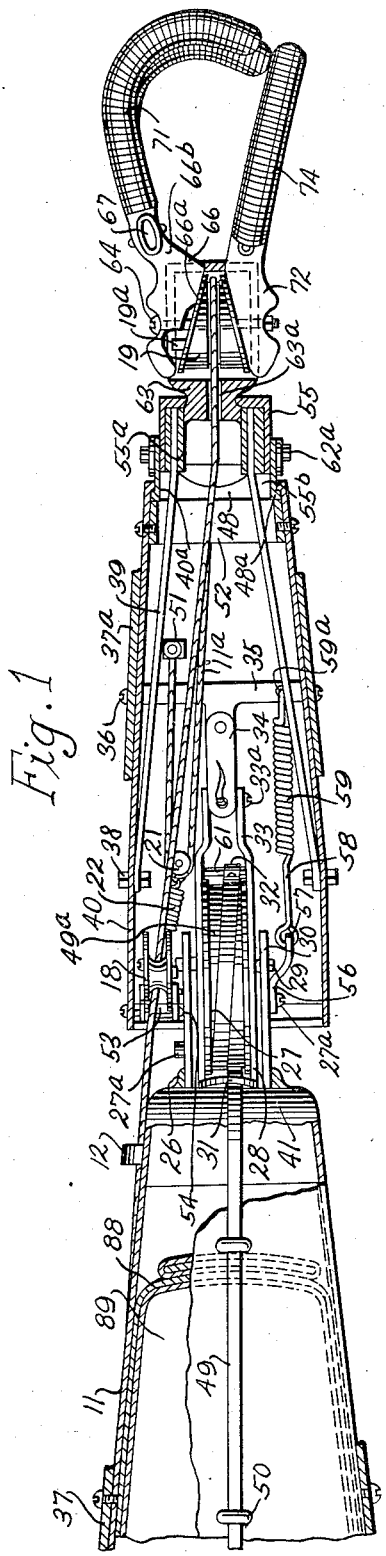
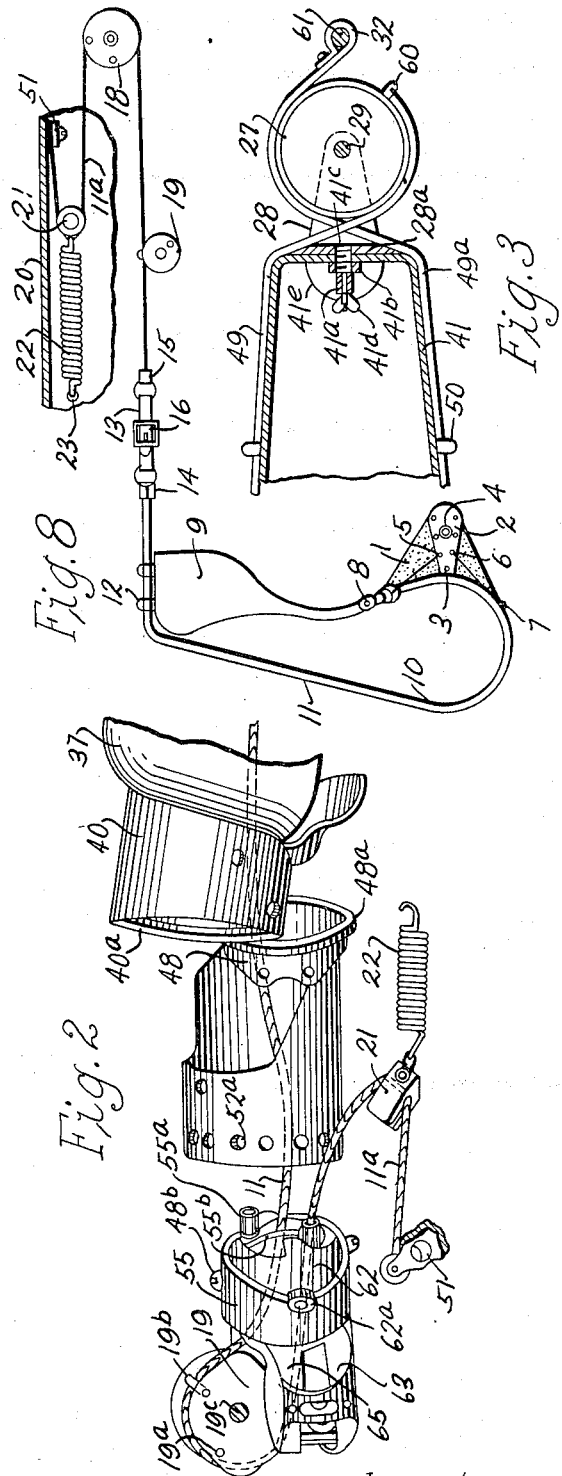
Inventor
Arthur F. Carmack
By G. C. Kennedy May 9, 1939.  A. F. CARMACK  2,157,747
ARTIFICIAL ARM
Filed Jan. 7, 1938  6 Sheets-Sheet 2
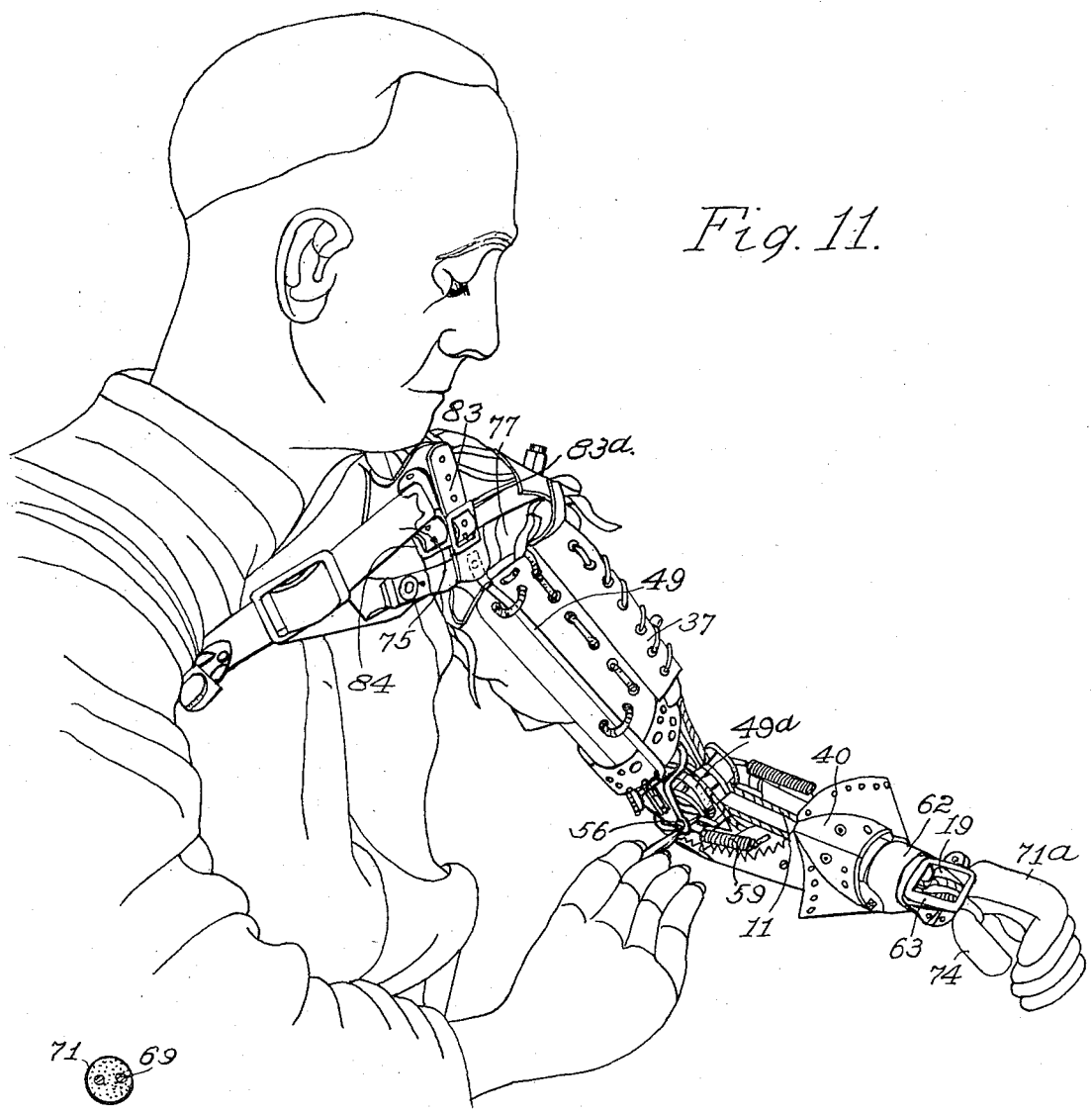
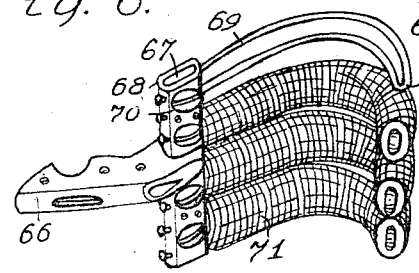
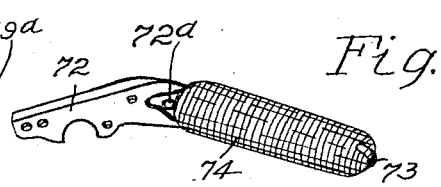
Inventor
Arthur F. Carmack,
By G.E. Kennedy
Attorney May 9, 1939.  A. F. CARMACK  2,157,747
ARTIFICIAL ARM
Filed Jan. 7, 1938   6 Sheets—Sheet 3

Inventor
Arthur F. Carmack,
By G. E. Kennedy,
Attorney

Inventor
Arthur F. Carmack,
By G.C. Kennedy.
Attorney

May 9, 1939.　　　A. F. CARMACK　　　2,157,747
ARTIFICIAL ARM
Filed Jan. 7, 1938　　　6 Sheets-Sheet 5

Inventor
Arthur F. Carmack,
By
Attorney

Patented May 9, 1939

2,157,747

UNITED STATES PATENT OFFICE 2,157,747

ARTIFICIAL ARM

Arthur F. Carmack, Clarksville, Iowa, assignor of one-half to William A. Hendry, Waterloo, Iowa Application January 7, 1938, Serial No. 183,907

6 Claims. (Cl. 3—12)

My invention relates to improvements in artificial arms, and the object of my invention is to provide a perfected type of device of this class, which will be operable easily and effectively, adjustably and overcome numerous defects in the devices of the prior art.

One especial object of my improvements is to furnish adjustable pendulous means in my device for operating the hand or grasping elements thereof effectively and reactively.

Another important feature is to provide adjustably connected arm members and having controllable connecting means therebetween, resiliently connected and operable.

Another improvement is to supply releasable locking and adjustable means between the arm members.

Another object of my improvements is the provision of efficient resiliently controlled means for wrist movements between the lower arm and the grasping terminal members.

Another object of my improvements is to supply an actuating mechanism for closing the grasping members, and for releasing them to be resiliently spread to opened positions, adjustably.

Another object of my improvements is to supply an improved construction of both of the grasping members, in their mounting for operation, and in their padding means.

Other objects of my improvements will be referred to hereinafter, as described and claimed.

I have accomplished the above improvements by the means and mechanism which are hereinafter described, claimed, and shown in the accompanying drawings, it being understood that various minor improvements may be made therein without departing from my invention or the scope of the claims.

Figure 13:
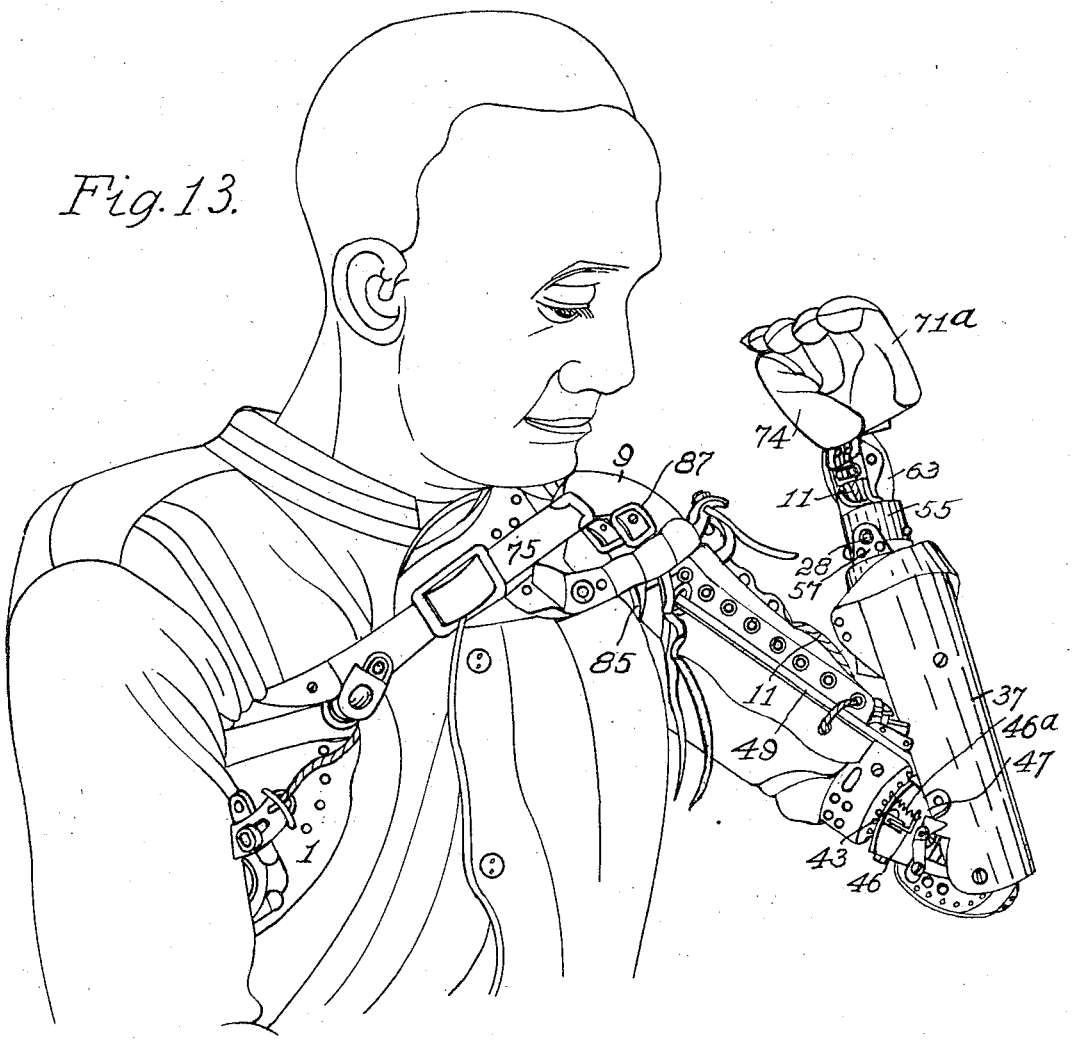
Figure 7:
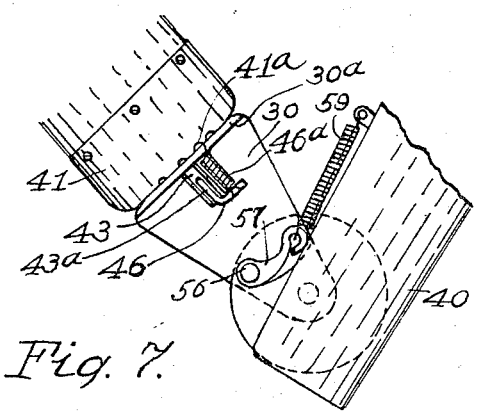
Figure 9:
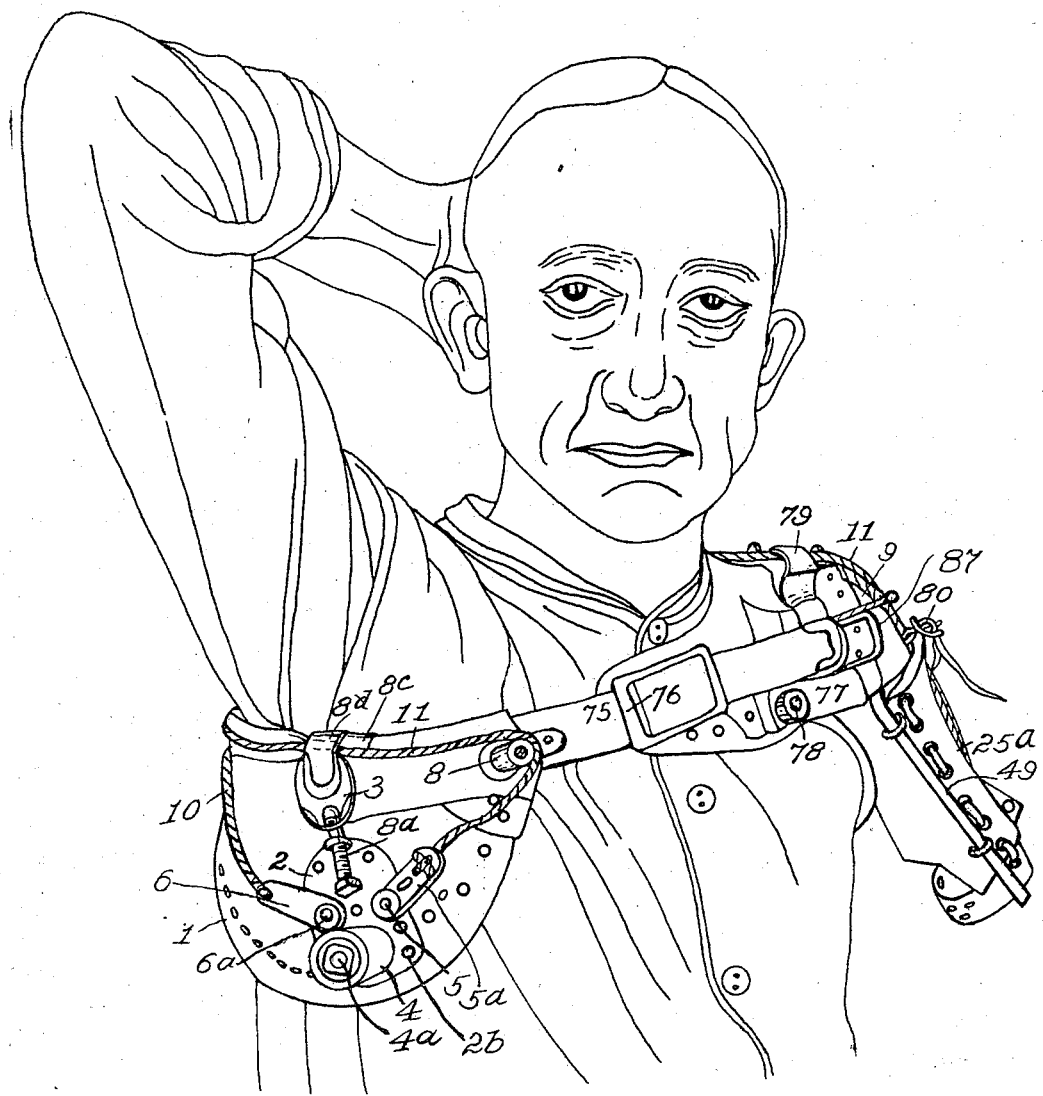
Figure 10:
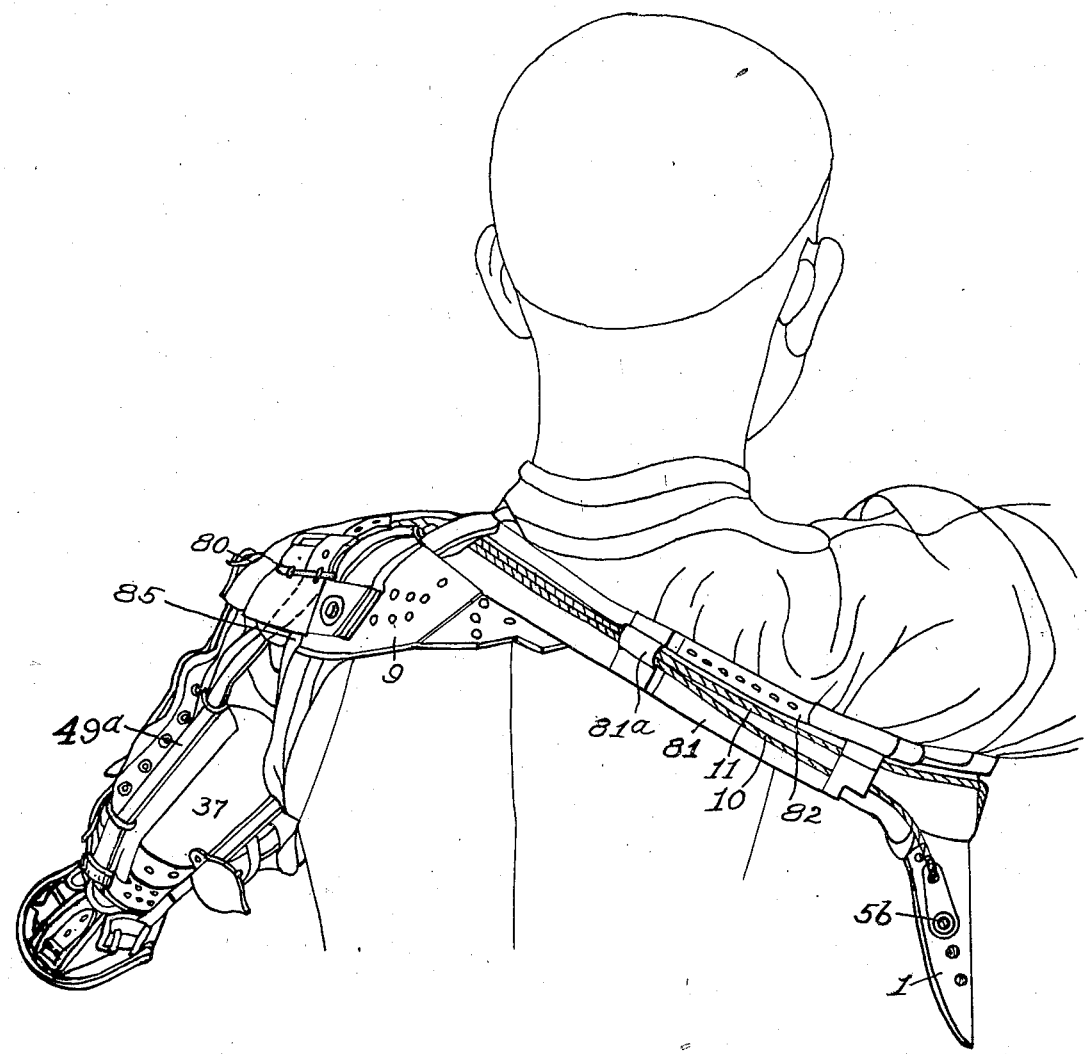
Figure 12:
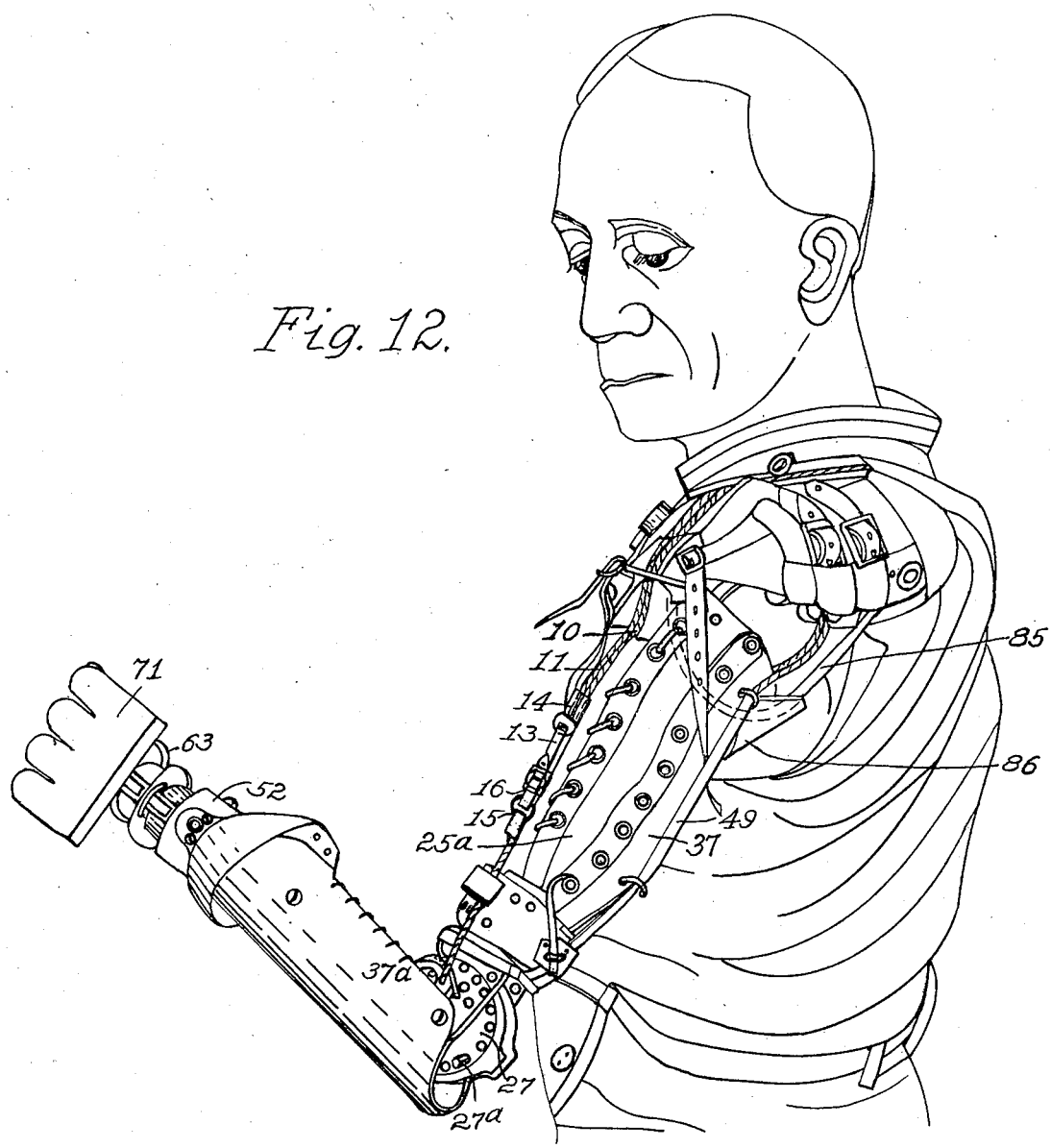

In the accompanying drawings, Fig. 1 is an assemblage of the principal mechanical elements of the invention as operatively assembled with the arm members and grasping parts, certain of which are longitudinally sectioned or broken away, and with the hand or grasping elements shown in closed or grasping position. Fig. 2 is a view of several of said elements as disassembled and spread apart. Fig. 3 is a top plan of a portion of the upper arm element, the pulley mounted at the lower end thereof, and the crossed belt elements reeved upon the pulley, with connecting terminal means therefor. Fig. 4 is a perspective view of the digital grasping device alone, with one digit loop bared of its discoidal padding. Fig. 5 is a similar perspective view of the other grasping member or thumb part of the grasping device, showing its like construction to either of the built-up digits of the device of Fig. 4. Fig. 6 is a plan view of one of the padding disks used on said digits. Fig. 7 is an inner side elevation, showing the upper arm and lower arm members flexed relative to each other, and also showing releasable locking means upon the lower member set to lock the lower member in an adjusted rockable position relative to the upper member. Fig. 8 is a reduced scale diagram of certain coacting features of my invention with other elements removed or broken away. Fig. 9 is a front view of my apparatus as fitted operatively upon the body of a wearer, with parts of the artificial arm removed. Fig. 10 is a similar view, showing the installation of the apparatus to the rear of the wearer. Fig. 11 is a three quarters frontal view of the wearer with the apparatus thereon, the lower part of the artificial arm extended, and Figs. 12 and 13 are like views, showing said lower arm part flexed and locked in that position.

In Fig. 1 is shown the forwardly cupped hollow arm member 41, which may have a flexible outer wrapping 37 secured thereupon, and receiving into the upper part of the member the stump of the wearer's left arm 89 with its end folded covering sleeve 88. The member 41 is suspensively hung by a strap 49 reeved through staples thereon and with the upper portion of the strap secured to an apertured wider strap member 83 secured adjustably to a buckle 83a on a housing part 9 mounted on the left shoulder.

A similar strap 49a as shown in Fig. 10, is adjustably buckled at its upper end to the member 9 and carried down through like loops 50 along the upper arm member along the opposite side thereof. It may be noted here that a looped strap 85 is carried under the arm as shown in Figs. 10 and 12 and end connected to the member 9 to retain the upper member 41 in place on the body of the wearer.

Referring to Fig. 3, 28 denotes swivel arms extending in parallel downwardly from a cross connection 28a, the latter being placed in contact with the closed end of the upper arm part 41 and secured thereto by a screw 41a having a nonturnable head 41c to lock it in place, said screw traversing said closed end and retained by a nut 41b in place. The stem of the screw 41a has a threaded seat receiving a screw 41d which traverses a medial hole in a curvate spring 41e to lock the latter in place with its terminations bearing against the inner transverse wall of the closed end of the upper arm member 41. The lower end portions of the straps 49 and 49a are carried inwardly past each other as shown in Fig. 3, the end of the strap 49 being secured to a stud 60 on the pulley 27, while the reversely directed strap end 49a is secured at 32 to a cross member 61 between fixed bars 33 secured to a medial arm 34 by a screw 33a, said arm being fixed on a cross-bar 35 secured by end screws 36 to opposite parts of the wall of the lower arm member 40. As shown in Fig. 1, a strong coiled spring 59 is secured at 59a to the cross member 35, the other end of the spring 58 being linked to an end of a bracketed arm 57 secured at 27a to the hither swivel furcation 30 eccentric to the cross-shaft 29 of the pulley 27. The lower arm member 40 may have a flexible cover 37a. The spring 59, when the arm member 40 is rocked in either of opposite directions becomes tensioned because of its eccentric connection to the hither furcation 30, and tends to return the member when the latter is turned adjustably and secured in a relative position to the upper arm member 41 as locked by a locking pin 46 to be described.

A tubular sleeve 48 best shown in Fig. 2 as reversed to its direction shown in Fig. 1, has an exterior flange 48a, and this flange is seated within the lower end of the arm member 40 and rockingly engages an interior flange 40a on a fixed sleeve 52 in the member 40.

Fig. 2 (and Fig. 1) show the sleeve 52 and the tubular member 48 as having their respective flanges coengaged so that the member 48 is turnable within the sleeve 52. Referring to Figs. 1 and 2, it will be seen that the elements shown in Fig. 2 are separated from each other loosely, and arranged reversely to the coacting same elements as shown in Fig. 1, with the sleeve 52 extending completely within the open lower end of the lower arm member 40, the said end of the sleeve 52 being secured rigidly within the member 40 by rivets. The inner end of the sleeve 52 has a number of holes 52a therearound, to receive said rivets. The sleeve 52 is inset within the member 40, which latter has a terminal inner flange 40a engaging loosely the said exterior flange 48a of the sleeve 48. A cupped member 55 has its open upper end within the sleeve 48 and has within its cupped part a ball cupped member 62 with pintles 62a seated in the sleeve 48.

The ball 62 has a fixed diminished neck part 63 which is the rigid stem of a rectangular framing, in whose longitudinal aperture a wedge-shaped pulley is rockably or turnably seated on a pintle 64 traversing the pulley and its framing. Similar rock-bodies 66 and 72 have elongated apertured seats traversed by said pintle. The pulley frame 63 is medially longitudinally slotted to mount therein said rock-bodies, and the latter have inclined inner edges to contact with opposite like inclined faces on the ends of the wedge pulley, whereby when the pulley is rocked the wedge ends thereof are swung from the framing 63 in either of opposite directions.

Within and part of the ball member 62 are tubularly socketed parts opposite each other laterally at 55a opening toward the interior of the arm member 40. A pair of like but reversed bar springs 39 have their outer ends seated loosely in the bores of the parts 55a, and their opposite ends are fastened non-turnably to the inner wall of the member 40 by bolts. It will be seen that when the frame 63 is rocked in the casing 55 at its pintles, its scope of rocking movements is restricted resiliently by the pair of spring members 39 when under torsion, and whereby the elements 55, 62 and 48 possess a wrist movement upon the arm member 40 in the nature of a universal joint except as limited in sidewise turning by the springs 39. The oppositely inclined wedge faces at 66a of the rockable bodies 66 and 72 when the wedge pulley 19 is rocked in one direction by a pull upon a cord 11 act upon the swingable bodies 66 and 72 to swing them to closed or grasping positions as long as the pull is maintained.

The cord 11 being clamped at 19b to the pulley 19, it is carried farther around the pulley in a circumferential groove thereon until a side lug 19a (see Fig. 2) is stopped by the framing part 63. The part 11a of the cord 11 is directed oppositely as shown in Fig. 1 and reeved upon a small pulley 21 controlled by a spring 22 in its loop with the return end part of the cord anchored at 51 to the inside wall of the arm member 40. As shown in the diagrammatic Figure 8 the cord 11 may have an inserted adjustable device being a strap 13 whose ends are secured in sockets 14 and 15, the strap being in two parts connected adjustably by means of a buckle 16, whereby the cord may be kept in lengthwise tension. The shoulder plate or member 9 is flexibly mountable upon the wearer's shoulder at or about the location of the arm stump 89. A flexible guard 1 has one extremity connected loosely to a part of the plate 9, as also shown in Fig. 9, by being carried around a pulley 8 on a strap 75 adjustably end connected by a buckle 76 mounted on the plate 9. The cord 11 is carried thence as shown in Fig. 10, around the shoulder to the front and connected to the socket 14, and strap connection 13, thence through the lower arm member 40 and wrist devices 52, 55, passage 63a in the framing stem and reeved upon the wedge-pulley 19. A plate 3 is secured dependingly on the upper part of the guard 1 by a hanger body 8d. A pendulum member 2 positioned over the guard 1 has a threaded bearing thereon traversed by a screw 8a adjustably, and with its upper end seated to turn in a bearing on the plate 3, adjustably supporting the pendulum. The pendulum 2 has ranged along opposite sides engaging studs 2b (see Fig. 9) upon which a cylindrical fingerhold member 4 is loosely mounted on an apertured core part at 4a, and this core part may be at its under end fitted removably upon either of the studs 2b or 5b. The outer end of the cord 11 is secured to a socket member 5a at a terminal thereof with the other end having a socket at 5, to permit adjusting of the cord 11 to the pendulum 2. Another cord 10 has one end secured to a member 6 having a socketed end adjustably secured at 6a to the opposite side stud on the pendulum. The other end of the cord 10 is carried about the left shoulder of the wearer and connected to the belt device 13.

Referring to Fig. 7, means are provided for releasably locking the swivel member 30 adjustably on the upper arm member 41. On one of the furcations 30 of the swivel member is a terminal medially perforated rib 30a. A tubular and partially longitudinally slotted bearing body 43 is fixed on this rib 30a with its bore alined with the perforation therein. A stem 43a is slidably rockably mounted in said bore and perforation, and has a terminal crank 46. A coiled spring 46a is end connected between said rib and said crank. A plurality of bearing apertures 41a are in the lower termination of the arm member 41, either of which may receive an end of the stem 43a when the crank 46 is rocked to a medial position to permit the spring to propel the stem into the longitudinal slot and hold it in one of the holes 41a, when the lower arm member 40 is rocked relatively to the member 41. It will be understood, that this securing device is used when by operation of the bands 49 and 49a about the pulley 27 as the arm member 41 is swung by forward swinging of the wearer's arm stump 89, the lower member 40 is flexed or not flexed upon said member 41. This flexing movement is aided by recoil of the spring 59 acting by means of the connection 57 upon the swivel device 30.

The member 40 is released when the crank 46 is rocked back to allow the stem 43a to be shifted out of the slot and aperture 41a in the arm member 41, and the crank rocked laterally and held by the spring 46.

Referring now to Figs. 1, and 4 to 6 inclusive, where the terminal grasping members 71 and 74 and their elements are shown, in Fig. 1 and also Fig. 4, the rocker element 66 has a finger-bar 67 mounted in sleeve parts 68 secured thereon by means of screws 70, removably. Four similar finger elements or digits 69 are removably mounted on the finger-bar, and each consists of a wire loop with parallel parts from a terminal bend at 69a, the loop extremities fixed to the finger-bar and closely spaced apart, all of the digits except the thumb digit 74 having a curvate bend in one direction. These digits have removable padding disks mounted thereon as shown at 71. The digits 71 have each a pair of perforations to seat therethrough the pairs of wires 69, the loops 69a closing the outer ends of the disks. Fig. 5 shows a similarly constructed thumb member 74 with stem 72a carrying one set of the disks 71 to the end loop 73. The member 74 swings from the framing 63 as does the other digits to and fro for cooperation, the thumb digit opposite the middle of the other members 71.

As shown in Figs. 12 and 13 the digits on the finger and thumb loops may have a glove covering them.

*Operation.*—The finger and thumb digits are normally spread to open position due to the tension of the spring 22 on the return part 11a of the cord 11. To close these members shown at 71 and 74 in Fig. 1, the wearer manually swings the pendulum device by means of the fingerhold 4—4a toward the artificial arm to shift the cord 10 with its connecting strap 13 and cord 11 to rock the wedge-pulley 19, and the cord return part 11a reeved around the pulley 18 tensions the spring 22. The wedge pulley in rocking by means of its inclined ends contacting with the like inclined faces 66a of the arms 66 and 72, causes the digits 71 and 74 to come together into end contact as shown in Fig. 1, where also they may grasp between them an object to be held. The arm members 41 may be swung forward or back by muscular action of the arm stump when desired, and when swung forwardly the strap 49a is placed under tension to rock the pulley 27 and at the same time by the connection 61 to the lower arm member 40 to flex the lower arm member upwardly, when as indicated in Fig. 7, the wearer may actuate the rockable pin 43a to a position permitting the pin to react from the tensioned spring 46a to enter an aperture 41a in the upper arm member 41 to hold the lower arm member in an adjusted laterally rocked position. When the pendulum member 2 is released, the tensioned spring 22 relaxes and shifts the cord parts 11a and 11 to rock the wedge pulley 19 back, the spring 22 also acting on the digits 71 and 74 to swing them apart to opened position, the pendulum 2 returning to its first position.

The opposite spring arms 39 as before stated, during any of these adjustments remain inert except when the load carried by the grasping members act under torsion through the wrist relatively movable members in turning as in shifting the load. It will be understood that the pendulum may be adjusted either vertically or laterally relative to the guard 1.

I claim:

1. In an artificial arm having upper and lower members, the lower part of the upper member having a plurality of pin-holes therearound, a swivel connection between said arm members rockable on the upper member with the lower member hingedly connected to the swivel, a pin rockably mounted on the swivel and also longitudinally movable thereon to enter and interlock with any of said pin-holes releasably, and resilient means connected between the pin and swivel, adapted to releasably lock the pin in a pin-hole of the upper member when the pin is rocked in one direction, and to be releasably held out of engagement with any pin-hole when the pin is withdrawn therefrom and rocked in an opposite direction.

2. In combination, an artificial arm composed of movably connected upper and lower members, a sheave rotatably mounted upon the upper member and seated within the upper part of the lower member, flexible connections secured to opposite upper parts at front and rear of the lower member, carried thence oppositely around the sheave and along front and rear parts of said members and mounted and secured upon front and rear parts of the body of the wearer, and resilient means connected between the adjacent end parts of said members, whereby the swinging of an arm stump on which the upper member is mounted will swing said lower member relatively to the upper member in either a forward or rearward direction.

3. In combination, an artificial arm having a movable terminal pair of hingedly connected grasping members mounted thereon, a pendulum swingingly mountable upon a part of a body opposite said arm, means for releasably securing the pendulum in a desired position of swinging adjustment upon the body, and a pair of flexible connections end-connected to opposite sides of the pendulum and carried about the body and united, with operating devices connected between the said connections and grasping members operable to either spread apart or bring together the members when the pendulum is appropriately adjustably swung in either of opposite directions upon the body.

4. In combination, an artificial arm having a movable terminal pair of hingedly connected grasping members mounted thereon, a wear-plate adjustably supported on a body opposite said artificial arm, a pendulum adjustably swingably mounted upon said wear-plate and having on its free end manually actuable engaging-means, the wear-plate having a plurality of open seats arranged therearound in the line of swing oscillation of said engaging-means for releasably securing the pendulum in any coacting adjusting position across it, a pair of flexible connections end-connected to opposite sides of the pendulum and carried about the body and adjustably connected, and operating devices connected to said connected connections flexibly and resiliently controlled, including means for swinging said grasping members to and from each other.

5. In combination, an artificial arm, a hollow frame with side apertures and having a stem device rockably and hingedly mounted on the outer end of said arm, a headed pintle traversing the apertures of said frame to project therefrom and a wedge-shaped pulley mounted in the hollow of the frame on said pintle, a pair of like transversely apertured stems seated loosely rockably on said pintle and having beveled inner faces movably contacting with the wedge faces of said pulley, spaced grasping devices mounted upon the outer terminations of said stems, a manually operable cable loosely traversing the stem of said frame, carried around the pulley, secured thereto and with its end part directed oppositely, and resiliently controlled in the same direction with its outer end secured to said arm, whereby when said cable is tensed in one direction the pulley is rocked to spread apart the grasping devices, and when the cable is released the pulley is reversely rocked to come to a grasping association with any interposed body.

6. In combination in an artificial arm, oppositely swingable stems mounted terminally thereon for releasably grasping an included body between them or releasing it, one stem having a cross-head, a plurality of like grasping fingers removably secured in juxtaposition along the cross-head, projecting outwardly relatively to the arm longitudinally, said fingers being terminally curved to one side and consisting each of wire loops whose terminations opposite the loops are detachably secured to the cross-head; the other stem having an outwardly directed straight single wire loop positioned medially opposite the plurality of wire loops on the first stem, a plurality of like yieldable packing disks each having a spaced pair of holes therethrough and mounted with the wire loop members traversing the holes with the disks in juxtaposition and end-locked on each loop and at the inner ends of the wires with said stems, and means for respectively resiliently swinging said stems to grasping or non-grasping positions.

ARTHUR F. CARMACK.